United States Patent
Habuta et al.

(10) Patent No.: US 8,440,283 B2
(45) Date of Patent: May 14, 2013

(54) OPTICAL INFORMATION RECORDING MEDIUM AND METHOD FOR PRODUCING SAME

(75) Inventors: Haruhiko Habuta, Osaka (JP); Noboru Yamada, Osaka (JP); Shinya Abe, Osaka (JP); Katsuyuki Takahashi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/501,265

(22) PCT Filed: Sep. 27, 2010

(86) PCT No.: PCT/JP2010/005784
§ 371 (c)(1),
(2), (4) Date: Apr. 11, 2012

(87) PCT Pub. No.: WO2011/048751
PCT Pub. Date: Apr. 28, 2011

(65) Prior Publication Data
US 2012/0207981 A1    Aug. 16, 2012

(30) Foreign Application Priority Data
Oct. 22, 2009   (JP) ................ P 2009-243002

(51) Int. Cl.
G11B 7/24        (2006.01)
(52) U.S. Cl.
USPC .............. 428/64.1; 428/64.4; 430/270.12
(58) Field of Classification Search ............. 428/64.4; 430/270.12
See application file for complete search history.

(56) References Cited

U.S. PATENT DOCUMENTS

| | | | |
|---|---|---|---|
| 6,788,635 B1 | 9/2004 | Aratani et al. | |
| 7,169,455 B2 * | 1/2007 | Habuta et al. ............. | 428/64.4 |
| 7,177,264 B2 * | 2/2007 | Aratani et al. ............. | 369/288 |
| 2004/0196779 A1 | 10/2004 | Aratani et al. | |
| 2005/0112019 A1 | 5/2005 | Nakai et al. | |
| 2005/0122887 A1 | 6/2005 | Abe | |
| 2006/0092819 A1 * | 5/2006 | Yeh et al. ............. | 369/275.1 |
| 2008/0259761 A1 * | 10/2008 | Kondo ............. | 369/94 |
| 2010/0260035 A1 | 10/2010 | Habuta et al. | |

FOREIGN PATENT DOCUMENTS

| | | |
|---|---|---|
| JP | 4-226785 | 8/1992 |
| JP | 2003-317318 | 11/2003 |

(Continued)

OTHER PUBLICATIONS

International Preliminary Report on Patentability issued May 24, 2012 in International (PCT) Application No. PCT/JP2010/005784, of which the present application is the national stage.
International Search Report issued Dec. 28, 2010 in International (PCT) Application No. PCT/JP2010/005784, of which the present application is the national stage.

*Primary Examiner* — Elizabeth Mulvaney
(74) *Attorney, Agent, or Firm* — Wenderoth, Lind & Ponack, L.L.P.

(57) ABSTRACT

The information recording medium 3 comprises an information layer having a metal layer 5 on a substrate 4, wherein concavo-convex portion is formed in the substrate to give main information such as image and voice, and the metal layer contains Al, Si and M (wherein M is at least one element selected from a group consisting of Cr and Ni) and enables sub-information to be additionally recorded therein at low cost by laser-beam 7 irradiation.

14 Claims, 9 Drawing Sheets

FOREIGN PATENT DOCUMENTS

| JP | 2005-158236 | 6/2005 |
| JP | 2005-196940 | 7/2005 |
| WO | 01/08145 | 2/2001 |
| WO | 2010/032348 | 3/2010 |

* cited by examiner

Fig. 2
(Reproduced signal of concavo-convex mark and added mark)
In case of no added mark
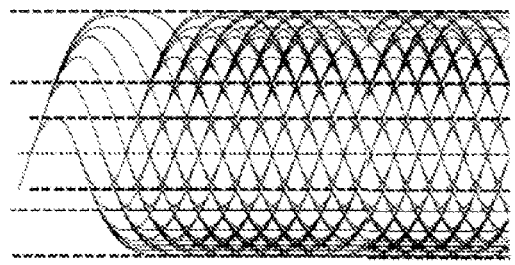
In case of recording added mark
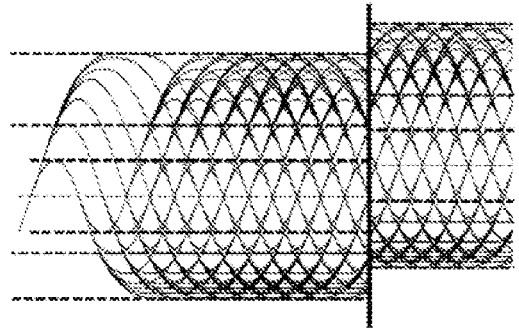
Portion where added mark is not recorded | Portion where added mark is recorded

OPTICAL INFORMATION RECORDING MEDIUM AND METHOD FOR PRODUCING SAME

FIELD OF THE INVENTION

The present invention relates to an optical information recording medium that is capable of recording and reproducing information at high density and high speed using optical means such as irradiation with laser beam, and particularly to an optical information recording medium on which sub-information is additionally recorded in addition to main information, such as image and voice, which has been recorded on the recording medium.

BACKGROUND ART

There has been known, as an information recording medium (hereinafter referred to as a "recording medium" or a "medium") that is capable of recording and reproducing information at high speed, and has a large capacity, an optical information recording medium typified by Digital Versatile/Video Disc (DVD) and Blu-ray Disc. This optical information recording medium performs recording and reproduction of information by making use of variation in reflectance in two different states and has such a large advantage that can optionally perform a random access and is also excellent in portability. Therefore, importance thereof has recently increased more and more.

Examples of a conventional optical information recording medium include a rewritable medium capable of rewriting many times, a write-once medium capable of writing only one time, and a reproduction-only medium capable of only reproducing. In general, the reproduction-only medium is easy to be manufactured and can be provided at low costs since the number of layers constituting the medium can be reduced as compared with the rewritable medium and write-once medium. Therefore, the reproduction-only medium has widely been used as a medium that distributes digital contents such as music, movie and game software.

Patent Document 1 discloses that, in a reproduction-only medium, sub-information such as a serial number of a medium is recorded by a barcode-shaped mark called as Burst Cutting Area (BCA), in addition to main information such as image and voice, and then processed by burning off an information recording layer (reflective film) using a YAG laser.

Also, Patent Document 2 discloses formation of a recording layer made of an alloy containing, as main components, at least one kind of an element selected from the group consisting of [Ge, Si, Sn] elements and at least one kind of an element selected from the group consisting of [Au, Ag, Al, Cu] elements, as a recording material of a write-once medium.

Furthermore, Patent Document 3 discloses an optical recording medium including an information layer equipped with a reflective film formed with an information recording part by a physical shape change, wherein the reflective film is capable of performing additional recording by thermography and is made of an Al alloy or Cu alloy having electrical resistivity of 20 µΩ·cm or more and 90 µΩ·cm or less. The same document discloses that this reflective film is preferably made of the Al alloy or Cu alloy containing one or more kinds of elements selected from at least Ti, Si, Cu, Al, Fe, W, Cr, O, Ar, Mg and Tb added therein. It becomes possible for the user to record the position where reproduction was finished and a mark of a game over point in game software in a reproduction-only optical recording medium by providing such a reflective film. Entry of the algorithm capable of decrypting data achieved by entry of encryption data makes it impossible to reproduce an illegally copied optical recording medium.

RELATED PATENT DOCUMENTS

[Patent Document 1] JP-A-2005-196940
[Patent Document 2] JP-A-4-226785
[Patent Document 3] JP-A-2003-317318

SUMMARY OF INVENTION

Problems to be Solved by Invention

However, the information recording medium disclosed in Patent Document 1 requires an expensive YAG laser for recording sub-information. This results in a problem of increasing the cost for manufacturing the information recording medium.

Further, it was found that the write-once information recording medium disclosed in Patent Document 2 may have unsatisfactory durability depending on the constitution of the optical disc and the composition of the material.

The optical recording medium described in Patent Document 3 makes it possible to additionally record information in the reflective film at low recording power. The document, however, only shows the relationship between the electrical resistivity, and the reflectance and the recording power and does not teach the composition or physical property required for increasing the reliability (particularly moisture resistance) of the added mark.

The present invention has been made to solve the problems of the above-described inventions and the object of the present invention is to provide an information recording medium containing main information such as image and voice, which enables sub-information to be additionally recorded thereon at low cost with high reliability.

Means to Solve the Problems

In order to solve the existing problems, the present invention provides an optical information recording medium including an information layer on a substrate, wherein said information layer has a metal layer, which is characterized in that:

(1) said information layer has a concavo-convex portion formed on said substrate, (2) said metal layer contains Al, Si, and M (wherein M is at least one element selected from a group consisting of Cr and Ni), optical property of the metal layer can be changed by irradiating said metal layer with laser beam, to form an added mark, whereby reproducible information can be recorded by laser-beam irradiation, and an Al atom content is 20 atomic % or more and 94 atomic % or less and an Si atom content is 3 atomic % or more and 77 atomic % or less and an M atom content is 3 atomic % or more and 77 atomic % or less assuming that a total number of Al atoms, Si atoms and M atoms contained in said metal layer is 100 atomic %.

This constitution eliminates the use of the YAG laser which is, required for recording sub-information in Patent Document 1. Further, the inclusion of Al, Si and M in the metal layer at the predetermined contents enables the information with high quality and high reliability to be recorded in the metal layer.

The optical information recording medium is preferably one wherein the concavo-convex portion gives the main information which is not rewritable. In other words, the optical information recording medium of the present invention is preferably a read-only medium in which main information has been recorded and sub-information can be additionally recorded in the metal layer.

Effect of the Invention

As described above, the optical information recording medium of the present invention can provide a recording medium, particularly a read-only medium (ROM medium), on which sub-information can be recorded or has been recorded, at low cost and can achieve further improvement of the corrosion resistance of the metal layer, that is, the reliability of the additionally recorded signal.

BRIEF DESCRIPTION OF DRAWINGS

FIG. 2 is a schematic view showing reproduced signals from the concavo-convex portion and the portion where the added mark formed in the metal layer exists, of the optical information recording medium according to the present embodiment.

EMBODIMENTS FOR CARRYING OUT THE INVENTION

Embodiments of the present invention are described with reference to the drawings below. The following embodiments are examples and the present invention is not limited to the following embodiments. Further, the same portions or elements are denoted by the same references and duplicative descriptions are eliminated in the following embodiments.

<1. Constitution of Optical Information Recording Medium>

Figure 1:
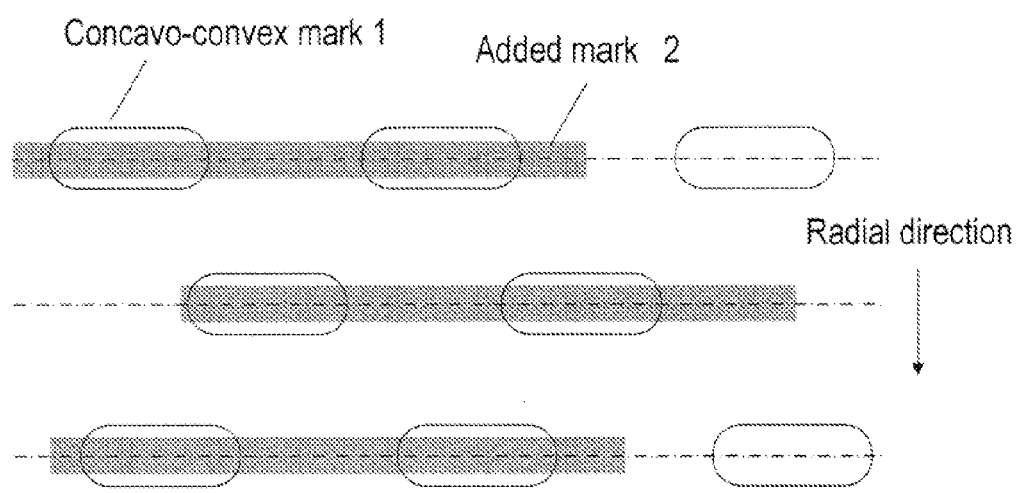
FIG. 1 is a schematic view showing a concavo-convex portion and an added mark formed on a metal layer of an optical information recording medium according to the present embodiment.

FIG. 1 is a schematic view of an optical information recording medium of the present embodiment. In the illustrated medium, a concavo-convex portion 1 is constructed by forming a concave portion called "pit" in a substrate. Added mark 2 is formed in a metal layer formed on the substrate where the concavo-convex portion 1 exists. An example of usage pattern of the concavo-convex portion 1 and the added mark 2 is one wherein main information such as image and voice is recorded as the concavo-convex portion 1 and sub-information such as a serial number of the medium is recorded as the added mark 2. The added mark 2 is not limited to the configuration shown in FIG. 1, and it may be formed by, for example, irradiating a portion between the concavo-convex portions 1 which are adjacent to each other in a radial direction, with laser beam. The concavo-convex portion is not limited to the pit, and may be a meander groove (a groove having wobble). In that case, main information as desired is recorded by designing the meander position and direction of the groove.

FIG. 2 is a schematic view of reproduced signals from the concavo-convex portion and the portion where the added mark exists, of the optical information recording medium of the present embodiment. When the optical information recording medium of the present embodiment is reproduced with a recording and reproduction apparatus, eye pattern (which shows the characteristics of signals graphically by superposing the samples of actual signals many times) of the concavo-convex portion 1 is detected as the reproduced signal in case that the added mark 2 is not formed. As shown in FIG. 1, when the added mark 2 is recorded on a portion of a track where the concavo-convex portion is formed, only the eye pattern from the portion where the added mark 2 is recorded, is raised as shown in FIG. 2. This envelope change in reflectance shows that the added mark 2 is recorded, and is used for the reproduction of the added mark 2.

The optical information recording medium of the present embodiment is preferably one wherein a reflectance is increased when irradiated with laser beam for forming the added mark 2. When foreign substance is attached to a surface of an optical information recording medium, defect which reduces a reflectance is formed in many cases. On the contrary, when the foreign substance is attached, the defect which increases the reflectance is rarely formed. For these reasons, it is preferable that the reflectance is increased in the portion where the added mark is formed in order to distinctively separate the additionally recorded signal from a signal (or noise) due to the defect which is inevitably developed upon manufacture of the optical information recording medium. Whereby, illegal copy or the like can be prevented more surely.

The optical information recording medium of the present embodiment is preferably one wherein the increase in reflectance due to the laser-beam irradiation for forming the added mark 2 is slight. Specifically, a reflectance Ra before the laser-beam irradiation and a reflectance Rb after the laser-beam irradiation for forming the added mark 2 (more specifically, the reflectance of the portion where the added mark is formed) preferably satisfy relationship of $1.0 < Rb/Ra < 1.1$. When the reflectance satisfies $Rb/Ra \geq 1.1$, the signal quality of the added mark is improved, whereas the signal quality of the concavo-convex portion is undesirably lowered.

It is preferable that recording sensitivity of the optical information recording medium of the present embodiment (the recording sensitivity upon recording the added mark on the optical information recording medium) is higher. This is because high recording sensitivity makes it possible to record the added mark with a read-only semiconductor laser of which power is low, and thus a recording and reproduction apparatus for the recording medium of the present embodiment can be realized at low cost. When, however, the recording sensitivity is too high, the added mark is deteriorated by the reproducing light. Therefore, the medium needs to have the reproduction durability which can endure the practical use. For example, the recording medium of the present embodiment preferably enables an added mark of satisfactory quality to be recorded using a recording power of 5 mW or less when rotated at a linear velocity of 9.84 m/s (72 Mbps, corresponding to BD 2× speed).

Further, the optical information recording medium of the present embodiment needs to have a sufficiently high reflectance in order that the main information is stably recorded and reproduced. Specifically, when the laser beam having a wavelength of 405 nm is used as the reproducing light, a reflectance of 30% or more is preferably achieved. This is for preventing stable reproduction of the information recording medium from becoming impossible. When foreign particles are attached to a surface of a pickup, the pickup receives less quantity of light, resulting in the failure of stable reproduction.

Further, the optical information recording medium of the present embodiment needs to maintain high signal quality over a long period of time, without being deteriorated by the laser-beam irradiation for reproducing the signal. For example, the medium of the present embodiment preferably has durability such that the quality of the signal reproduced from the concavo-convex portion and the quality of the signal reproduced from the added mark are not deteriorated even if the medium is subjected to one-million cycles of laser-beam irradiation.

The details of the constitutional elements of the information recording medium which are required for satisfying the necessary condition are described below.

Figure 3:
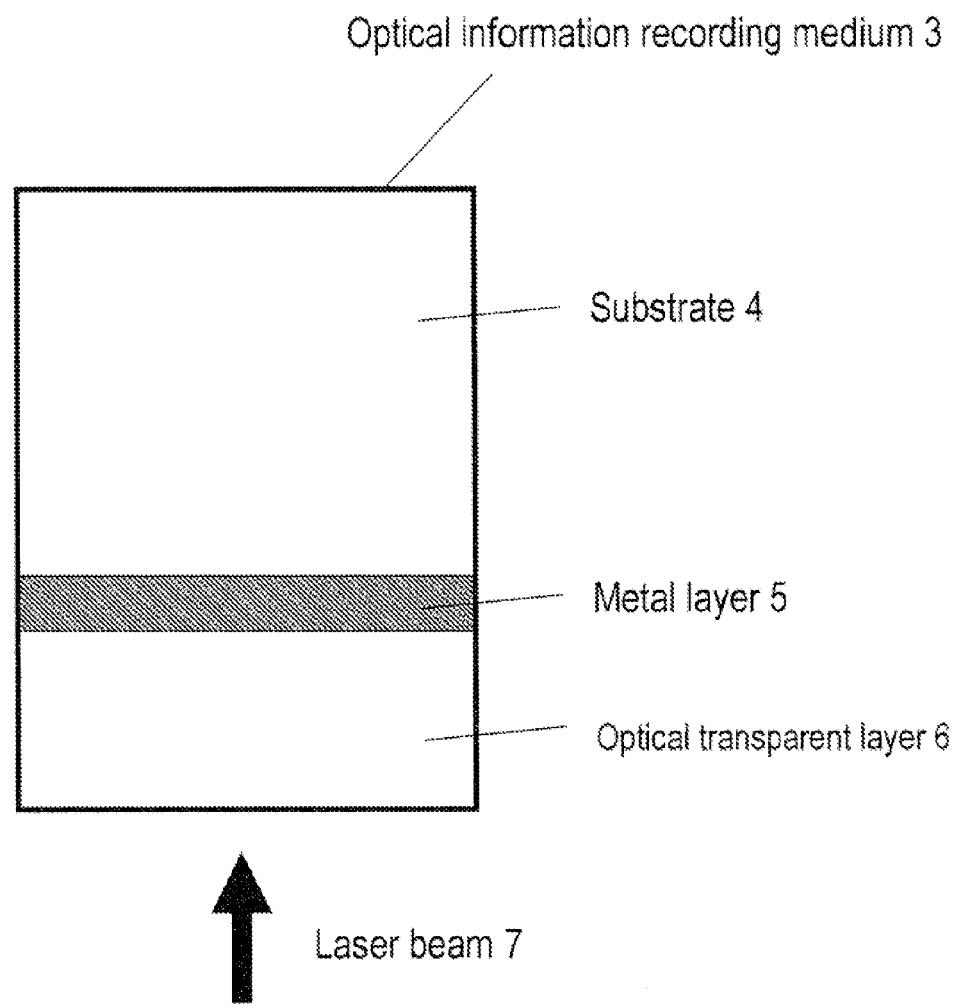
FIG. 3 is a cross-sectional view of one constitutional example of an optical information recording medium according to the present embodiment.

FIG. 3 is a cross-sectional view of one constitutional example of an optical information recording medium of the present embodiment.

The optical information recording medium 3 consists of a substrate 4, a metal layer 5 and an optical transparent layer 6. In this embodiment, a concavo-convex portion (not shown) formed in the substrate 4 and the metal layer 5 constitute an information layer. The metal layer 5 is formed on the substrate 4. Further, an optical transparent layer 6 (which is also called "cover layer" or "protective layer") is formed on the metal layer 5.

The reproduction of the information from the optical information recording medium 3, which information is recorded as the concavo-convex portion, and the recording of the information on the metal layer and the reproduction of the information recorded on the metal layer (these operations are collectively called "recording and reproduction of information" hereinafter) are carried out by applying laser beam 7 from the optical transparent layer 6 side.

The metal layer of the constitution shown in FIG. 3 functions as a reflective layer when the information is reproduced from the concavo-convex portion formed in the substrate 4 and functions as a recording layer when the sub-information is recorded. The metal layer 5 is formed of a material containing Al, Si and M (wherein M is at least one element selected form a group consisting of Cr and Ni). Particularly, Cr is preferably used as M. This is because higher reliability is obtained.

Al has property of easily forming crystal having a large particle diameter upon crystal growth. The metal layer of the information recording medium of the present invention prevents the Al crystal of a Large particle diameter from generating by the inclusion of Si and M (in particular Cr). This prevents the quality of signal reproduced from the concavo-convex portion, from deteriorating due to large crystal particle.

When the metal layer 5 is formed into a thin film by, for example, sputtering, Al—Si is a composite material wherein fine particles of Si are dispersed in Al or Si is segregated at grain boundary between Al crystal particles just after the film is formed. When the metal layer containing Al, Si and M is irradiated with the laser beam, thermal deformation of the metal layer (an Al—Si-M thin film), crystallization of Si, crystal growth of Al and thermal deform of the substrate and/or the optical transparent layer and so on occur. Detection of change in reflectance due to these phenomena can realize one-time recording of information in the metal layer and the reproduction of recorded information (that is, a write-once recording medium on which information can be recorded only once in a recording layer assuming that the metal layer is the recording layer).

The element M is dispersed in Al or Si and thereby makes the Al grain diameter fine, and/or forms a compound with Al and/or Si. Whereby, M serves to improve the reliability of the metal layer 5.

Preferable compositional range of Al, Si and M contained in the metal layer 5 is one wherein a content of Al atom is 20 atomic % or more and 94 atomic % or less, a content of Si atom is 3 atomic % or more and 77 atomic % or less and a content of M atom is 3 atomic % or more and 77 atomic % or less assuming that the total of Al, Si and M is 100 atomic %. The reasons why this compositional range are preferable is described below.

When the Al atom content is 20 atomic % or less, a reflectance which is sufficiently high for reproducing stably the signal from the concavo-convex portion of the information recording medium, may not be ensured. On the other hand, when the Al atom content is over 94 atomic %, concavity and convexity are formed on the surface of the metal layer by effect of columnar structure of Al alloy, resulting in too much noise component. As a result, the quality of signal reproduced from the concavo-convex portion may deteriorate. For these reasons, the content of Al atom is preferably within the above-described range.

In case of the Si content of less than 3 atomic %, when the metal layer 5 is irradiated with the laser beam for recording information, the optical change between the portion irradiated with the laser beam (the recorded portion) and the portion not irradiated with the laser beam (the non-recorded portion) may be too small. Further, when the M atom content is less than 3 atomic % (wherein M is at least one element selected from a group consisting of Cr and Ni), moisture resistance may deteriorate. On the other hand, the content of Si and/or M is too large, the content of the other atoms is small, whereby the other atoms may not function satisfactorily. Therefore, the contents of Si and M are preferably in the above-described range.

Figure 7:
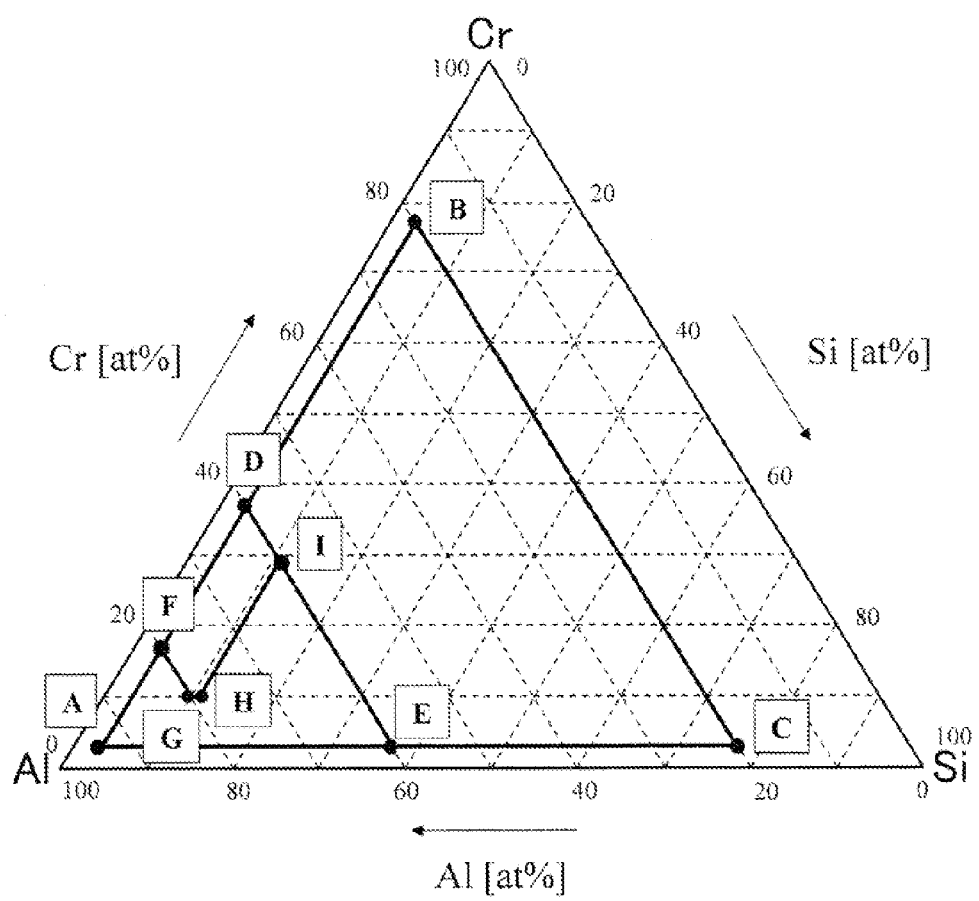
FIG. 7 is a ternary composition diagram of Al—Si—Cr.

FIG. 7 is a ternary composition diagram in case that M is Cr, that is, the ternary composition diagram of Al—Si—Cr. The above-mentioned preferable compositional range is a region enclosed by A-B-C in FIG. 7, and is a region wherein the content of Al atom is 20 atomic % or more and 94 atomic % or less, the content of Si atom is 3 atomic % or more and 77 atomic % or less and the content of M atom is 3 atomic % or more and 77 atomic % or less.

Further, more preferable compositional range of Al, Si and M contained in the metal layer 5 is one wherein the Al atom content is 60 atomic % or more and 94 atomic % or less, the Si atom content is 3 atomic % or more and 37 atomic % or less and the M atom content is 3 atomic % or more and 37 atomic % or less assuming that the total of Al, Si and M is 100 atomic %. This compositional range is a region enclosed by A-D-E in FIG. 7. The application of this compositional range to the information recording medium can ensures higher reflectance compared to the above-mentioned compositional range (the region enclosed by A-B-C). Since the reflectance of the metal layer is required to be higher in an information layer which is further when viewed from a laser-beam incident plane of a multi-layered information recording medium composed of two or more information layers as described below, this compositional range is particularly more suitable for constituting a metal layer in an information layer which is further when viewed from the Laser-beam incident plane in the multi-layered information recording medium.

Furthermore, a further preferable composition range of Al, Si and M contained in the metal layer 5 is one wherein the Al atom content is 60 atomic % or more and 80 atomic % or less, the Si atom content is 3 atomic % or more and 12 atomic % or less and the M atom content is 10 atomic % or more and 37 atomic % or less assuming that the total of Al, Si and M is 100 atomic %. This compositional range is a region enclosed by D-f-G-H-I in FIG. 7. The application of this compositional range to the information recording medium can ensures higher reliability compared to the above-mentioned compositional ranges (the regions enclosed by A-B-C and A-D-E).

The metal layer 5 may contain two elements, Cr and Ni, as the constituent element M.

The metal layer 5 may contain an element other than Al, Si and M. For example, at least one element selected from, S, N, F, B and C may be added for the purpose of adjusting thermal conductivity and optical constant and improving thermal resistance and environmental reliability, and so on. These additional elements is preferably contained in an amount of 20 atomic % or less of all the atoms constituting the entire metal layer, and more preferably 10 atomic % or less. The metal layer 5 may contain oxygen due to natural oxidation as described below, or an element originated from an atmosphere gas used during the formation of metal layer 5. Or, a target used for sputtering may contain minute amounts of another element upon manufacture of the target. In that sense, it may be difficult to constitute the metal layer 5 only of Al, Si and M, and the metal layer 5 may contain elements such as oxygen and argon in a slight amount (for example, of 20 atomic % or less, preferably 10 atomic % or less and more preferably 5 atomic % or less). Actually, the metal layer 5 contains minute amounts of other elements in many cases. Taking that other elements are inevitably contained in the metal layer as described above, the metal layer which is formed with the intention that the metal layer consists of Al, Si and M, may be called "a metal layer essentially consisting of Al, Si and M".

A film thickness of the metal layer 5 is preferably 3 nm or more and 100 nm or less. When the film thickness of the metal layer 5 is less than 3 nm, a reflectance which is sufficiently high to reproduce the information recording medium stably may not be ensured. When the film thickness of the metal layer 5 is over 100 nm, the time required for forming the metal layer 5 is long, which is not preferable from the viewpoint of productivity.

Figure 8:
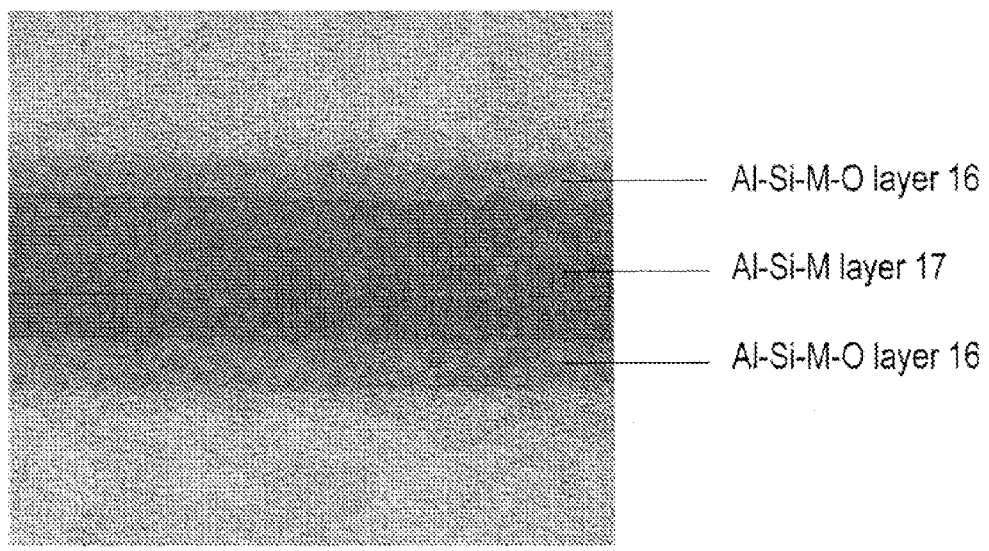
FIG. 8 is a cross-sectional TEM picture of an optical information recording medium according to the present embodiment.

The metal layer 5 may be naturally oxidized. As a result, a layer containing an oxide(s) of one or more atoms selected from Al, Si and M in large quantity may be formed on one or both of surfaces (which are vertical to the thickness direction of the medium) of the metal layer 5. For example, a constitution is exemplified wherein an Al—Si-M layer 17 (metal layer), in which the oxygen content is low or zero, is disposed in the center and Al—Si-M-O layers 16 are formed on both sides as shown in FIG. 8 which is a cross-sectional TEM picture of the metal-layer part in the optical information recording medium of the present embodiment. Here, the Al—Si-M-O layer 16 needs to be constituted such that main component (80% or more of the entire atoms occupying the metal layer) consists of Al, Si, M and O, as described above. The Al—Si-M-O layer 16 improves corrosion resistance of the Al—Si-M layer (the metal layer) 17.

When the metal layer 5 is subjected to natural oxidation to form a three-layered structure shown in FIG. 3, the thicknesses of the Al—Si-M layer 17 and the Al—Si-M-O layer 16 and the amount of oxygen atom contained in the metal layer 5 vary depending on the composition and the thickness of the metal layer 5. Even if the metal layer 5 is oxidized in any manner, it is desired that the metal layer 5 is constructed such that the recording sensitivity and the reflectance as described above are achieved in the optical information recording medium. Therefore, it is desired that the metal layer 5 is designed such that the Al—Si-M-O layer 16 is formed to the extent as described above. Further, it is desired that the metal layer 5 is designed such that the oxygen atom is contained in the metal layer to the extent as described above.

Figure 4:
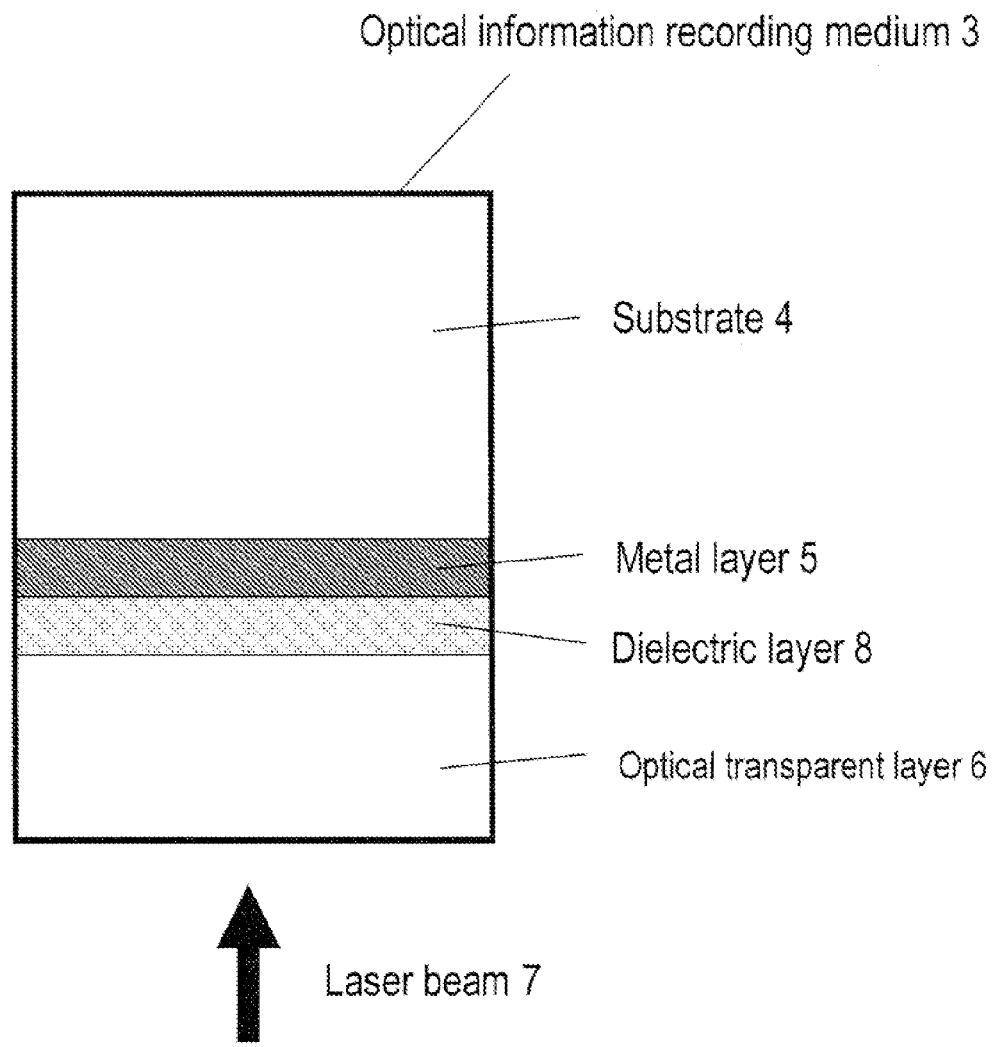
FIG. 4 is a cross-sectional view of another constitutional example of an optical information recording medium according to the present embodiment.

FIG. 4 is a cross-sectional view of another constitutional example of an optical information recording medium of the present embodiment. The optical information recording medium 3 consists of a substrate 4, a metal layer 5, a dielectric layer 8, and an optical transparent layer 6. The dielectric layer 8 is formed adjacent to the metal layer 5 in order to improve the reliability of the optical information recording medium 3. Specifically, the dielectric layer 8 suppress mixing of the material of the substrate 4 with the material of the metal layer 5 when the substrate 4 is molten or softened by the laser-beam irradiation for information recording, resulting in improvement of reliability of the recording medium (specifically moisture resistance of the metal layer). The position where the dielectric layer 8 is provided is not limited to the position shown in FIG. 4 and it may be between the metal layer 5 and the substrate 4. In the recording medium having the constitution shown in FIG. 4, the information layer consists of concavo-convex portion (not shown) formed in the substrate 4, the metal layer 5 and the dielectric layer 8.

The main purpose of providing the dielectric layer 8 is protection of the metal layer 5. The dielectric layer 8 is formed such that the main component is one compound selected from a sulfide such as ZnS and so on, a selenide such as ZnSe an oxide such as $SiO_2$, $Al_2O_3$, $TiO_2$, $Ta_2O_5$, $ZrO_2$, $Cr_2O_3$, $Nb_2O_5$, $Bi_2O_3$ and $Bi_4Ti_3O_{12}$ and so on a nitride such as Ge—N, $Si_3N_4$ and AlN and so on, a nitride oxide such as Ge—O—N, Cr—O—N, Si—O—N, Al—O—N, Nb—O—N, Mo—O—N, Ti—O—N, Zr—O—N and Ta—O—N and so on, a carbide such as SiC and so on, and a fluoride such as $AlF_3$, $CaF_2$ and $LaF_3$ and so on, or an appropriate combination thereof (for example, ZnS—$SiO_2$).

A film thickness of the dielectric layer 8 is preferably 2 nm or more and 100 nm or less. This is because, when the film thickness of the dielectric layer 8 is within this range, the reliability of the information recording medium can be improved without reducing the productivity thereof.

Figure 5:
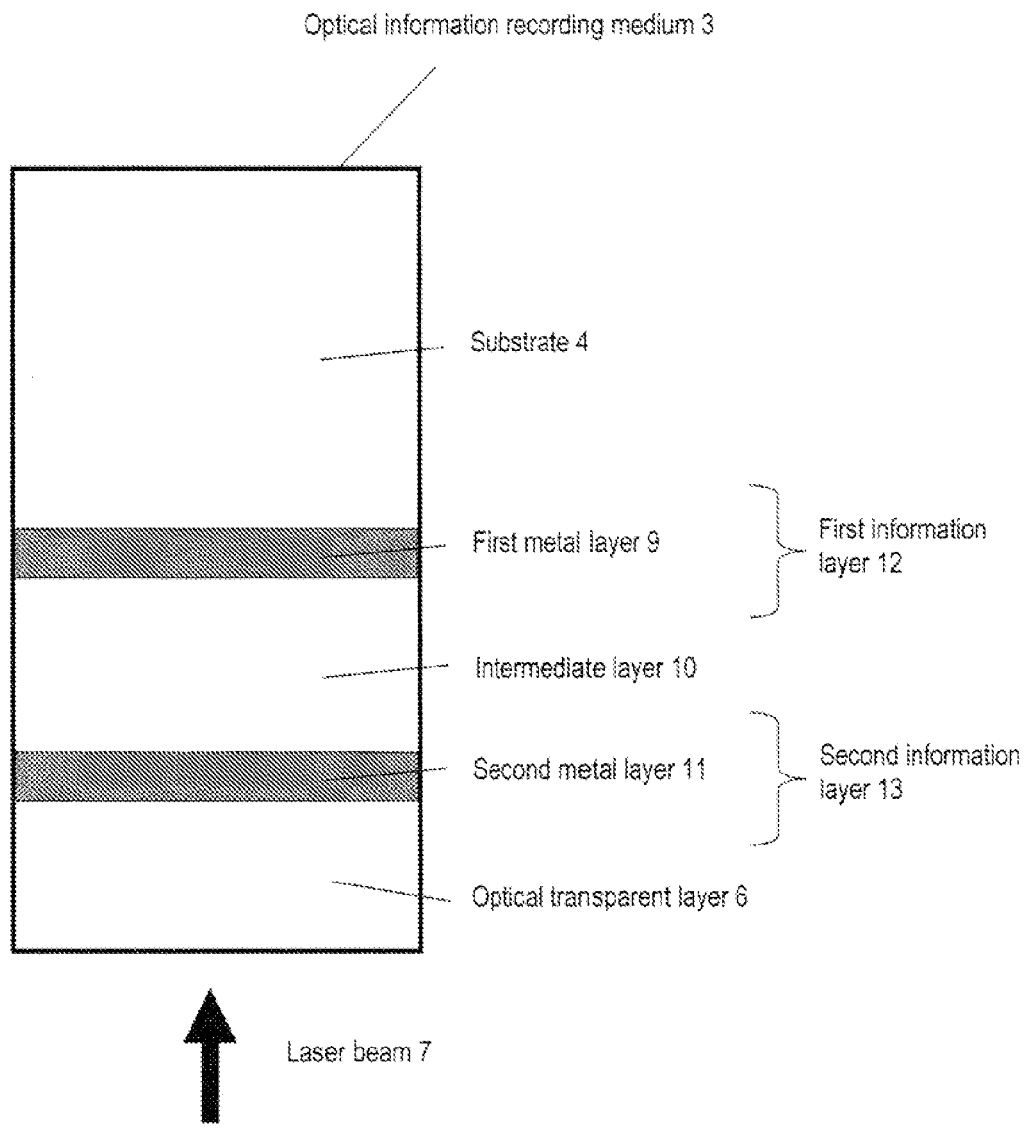
FIG. 5 is a cross-sectional view of yet another constitutional example of an optical information recording medium according to the present embodiment.

FIG. 5 shows a cross-sectional view of yet another constitutional example of an information recording medium of the present embodiment. The optical information recording medium 3 consists of a substrate 4, a first information layer 12, an intermediate layer 10, a second information layer 13 and an optical transparent layer 6. The first information layer 12 and the second information layer 13 are constructed by being provided on the substrate 4 in this order. The intermediate layer 10 is interposed between the first information layer 12 and the second information layer 13 to separate optically the first information layer 12 from the second information layer 13 such that unnecessary optical interference is eliminated. Further, the intermediate layer 10 has a concavo-convex portion (not shown) provided on the side in contact with a second metal layer 11. The optical transparent layer 6 is formed on the second information layer 13. The recording and reproduction of information is conducted in the optical information recording medium 3 shown in FIG. 5 by applying laser beam 7 from the optical transparent layer 6 side.

The first information layer 12 consists of the concavo-convex portion (not shown) formed in the substrate 4 and a first metal layer 9 and the second information layer 13 consists of the concavo-convex portion (not shown) recorded in the intermediate layer 10 and the second metal layer 11. A dielectric layer may be provided adjacent to the metal layer similarly to the constitutional example shown in FIG. 4, so as to improve the reliability. The film thickness of the second metal layer 11 is preferably thinner than that of the first metal layer 9. This is because the recording and reproduction of information in the first information layer 12 is conducted by the laser beam which has passed through the second information layer 13.

Both of the first metal layer 9 and the second metal layer 11 preferably contain Al, Si and M (wherein M is at least one element selected from a group consisting of Cr and Ni). The metal layer containing Al, Si and M is as described in connection with the metal Layer 5 with reference to FIG. 3. However, both of the metal layers do not necessarily need to contain Al, Si and M (wherein M is at least one element selected from a group consisting of Cr and Ni), and one of the metal layers needs to contain Al, Si and M (wherein M is at least one element selected from a group consisting of Cr and Ni). For example, the first metal layer 9 may be formed of a material containing Al, Si and M, while the second metal layer 11 may be formed of a material of which main component is Ag. In that case, only the first information layer 12 is a write-once information layer which enables information to be recorded in the metal layer.

Figure 6:
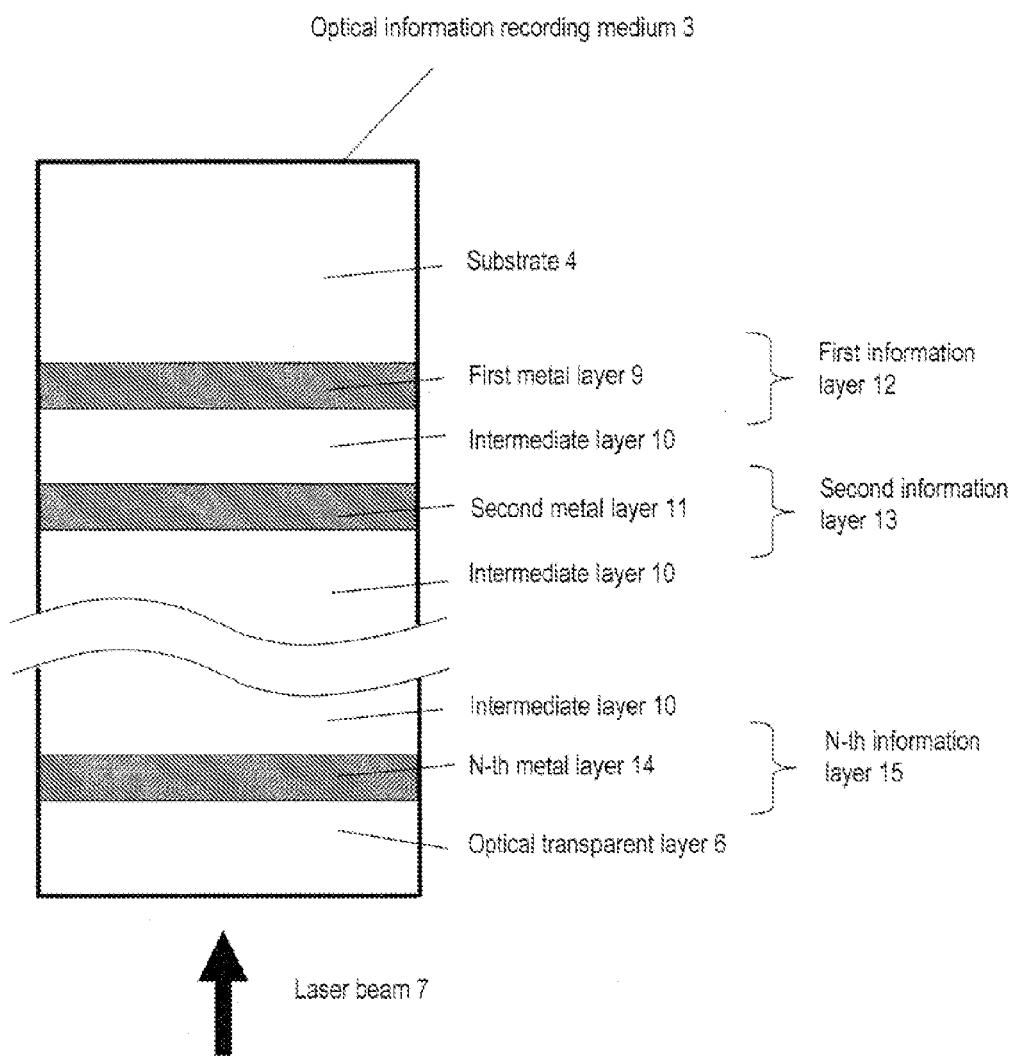
FIG. 6 is a cross-sectional view of still another constitutional example of an optical information recording medium according to the present embodiment.

FIG. 6 shows a cross-sectional view of still another constitutional example of an optical information recording medium of the present embodiment. The optical information recording medium 3 consists of a substrate 4, a first information layer 12, an intermediate layer 10, a second information layer 13, - - - , an intermediate layer 10, - - - , an intermediate layer 10, a n-th information layer 14 and an optical transparent layer 6. The first information layer 12, the second information layer 13, - - - and the n-th information layer 15 (n≧3) are provided on the substrate 4 in this order. The intermediate layer is interposed between the adjacent information layers to separate optically the respective information layers such that unnecessary optical interference is eliminated. Further, each intermediate layer 10 has a concavo-convex portion (not shown) formed on the side in contact with each metal layer. The optical transparent layer 6 is formed on the n-th information layer 15. The recording and reproduction of information is conducted for the optical information recording medium shown in FIG. 6 by applying laser beam 7 from the optical transparent layer 6 side. The n-th information layer 15 consists of the concavo-convex portion recorded in the intermediate layer 10 adjacent to a n-th metal layer 14 and the n-th metal layer 14. A dielectric layer may be provided, adjacent to the metal layer similarly to the constitutional example shown in FIG. 4 so as to improve the reliability. In the illustrated constitutional example, a film thickness of the (k−1)th metal layer (wherein k is an integer of 2 to n) is preferably thinner than that of the k-th metal layer. This is because the recording and reproduction of information in the k-th information layer is conducted by the laser beam which has passed through the layers up to the (k−1)th information layer.

Any of the first metal layer 9, the second metal layer 11, - - - , and the n-th metal layer 14 preferably contains Al, Si and M (wherein M is at least one element selected from a group consisting of Cr and Ni). The metal layer containing Al, Si and M is as described in connection with the metal layer 5 with reference to FIG. 3. However, all the metal layers do not necessarily contains Al, Si and M (wherein M is at least one element selected from a group consisting of Cr and Ni). For example, the first metal layer 9 may be formed of a material containing Al, Si and M, while the second metal layer 11, - - - , and the n-th metal layer 14 may be formed of a material of which main component is Ag. In that case, only the first information layer 12 is a write-once information layer which enables information to be recorded in the metal layer.

In any of the constitutional examples, the substrate 4 is generally a transparent substrate having a disk shape. Materials for the substrate 4 include a polycarbonate resin, a polymethylmethacrylate resin, a polyolefin resin, a norbornene resin, an ultraviolet-curable resin, glass, and an appropriate combination thereof. Further, a thickness of the substrate 4 is not particularly limited, and may be about 0.01 mm to about 1.5 mm.

The material of the optical transparent layer 6 preferably has a low light absorption relative to the wavelength of the laser beam 7 and a low birefringence in the short wave range. Specifically, a polycarbonate resin, a polymethylmethacrylate resin, a polyolefin resin, a norbornene resin, an ultraviolet-curable resin, glass, or an appropriate combination thereof may be used. Further, a thickness of the optical transparent layer 6 is not particularly limited, and may be about 0.01 mm to about 1.5 mm. When a numerical aperture of an objective lens which focuses the laser beam used for the recording and reproduction of information is 0.75 to 0.95, the thickness of the substrate is preferably in a range of 1.00 mm to 1.20 mm so as to maintain strength during the manufacture of the disk, and the thickness of the optical transparent layer 6 is preferably in a range of 0.03 mm to 0.20 mm so as to reduce the allowable range to tilt. On the other hand, when the numerical aperture of the objective lens is 0.55 to 0.75, the thickness of the substrate 4 is preferably in a range of 0.50 mm to 0.70 mm and the thickness of the optical transparent layer 6 is preferably in a range of 0.50 mm to 0.70 mm.

A transparent polycarbonate resin, a polymethylmethacrylate resin, a polyolefin resin, a norbornene resin, an ultraviolet-curable resin, glass, or an appropriate combination thereof may be used as the material of the intermediate layer 10, similarly to the optical transparent layer. A thickness of the intermediate layer 10 needs to be equal to or greater than a focal depth determined by the numerical aperture NA of the objective lens and a wavelength λ of the laser beam such that, when information is reproduced from any one information layer, cross talk from the other information layer(s) is reduced. Further, the thickness of the intermediate layer 10 is selected such that the laser beam is focused on all the information layers. Furthermore, when three or more information layers are stacked, the thicknesses of the respective intermediate layers are preferably different from each other. This is because, if the thicknesses of the intermediate layers are the same, the information layers are placed at regular intervals and the laser beam to be used for recording and reproduction of information in an (m−2)th information (wherein m is an integer of 3 or more) may be focused on an m-th information layer, which may increase the cross talk (here, the m-th information layer is further than the (m−2)th information layer from the laser incident plane).

The present invention is not limited to the optical information recording mediums shown in FIGS. 3 to 6 and may be applied to various constitutions. For example, the same effect can be obtained when the dielectric layers are provided on both sides of the metal layer. Alternatively, if the medium of the present invention includes two or more information layers, one information layer may be a layer wherein main information is recorded in the form of concavo-convex portion of the substrate or the intermediate layer (that is, a ROM layer), and the other information layer may be a layer in which main information can be recorded once (that is, a write-once layer) or a layer in which main information is rewritable (that is, a RAM layer or a RW layer). Alternatively, the present invention may be applied to a recording medium to which laser beam is applied from the substrate side.

<2. Production Steps of Optical Information Recording Medium>

Concavo-convex portion 1 is previously formed on a surface of a substrate 4 by transfer. The procedures for manufacturing the substrate 4 with the concavo-convex portion 1 formed therein are as follows.

Firstly, a glass master on which photoresist is applied is irradiated with laser beam or electron beam based on authored contents data such that the photoresist is exposed, and then developed, thereby giving a disc master wherein the concavo-convex portion is cut. Next, a side of this disc master where the concavo-convex portion is formed is plated to form a metal stamper having a concavo-convex portion complementary to the concavo-convex portion formed in the disk master. Then, a transparent resin is subjected to injection molding with the use of this stamper to form a optical-disk substrate 4 having the concavo-convex portion 1.

When an optical information recording medium 3 has a constitution shown in FIG. 3, the medium is manufactured by a method wherein a metal layer 5 is formed on the substrate 4 and then an optical transparent layer 6 is formed. The optical transparent layer 6 may be formed by a method wherein a medium in which lamination has been made up to the metal layer 5 is bonded to a substrate having an adhesive resin applied on one side. Alternatively, the optical transparent layer 6 may be formed by a method wherein a laminate in which the metal layer 5 has been finally formed is bonded to a sheet-like substrate with an ultraviolet curable resin, and then ultraviolet ray is applied. Alternatively, the optical transparent layer 6 may be formed by a method wherein an ultraviolet curable resin is applied, by a spin coating method, on a laminate in which lamination has been made up to the metal layer 5, and then the resin is cured with ultraviolet ray.

An optical information recording medium having constitution shown in FIG. 4 can be manufactured by adding a step of forming a dielectric layer 8 to the above-described manufacturing method of the medium having the constitution shown in FIG. 3. Optical information recording mediums 3 shown in FIGS. 5 and 6 can be manufactured by adding the step of forming the intermediate layer and the step of forming the metal layer n–1 times (wherein n is a number of information layers) to the above-described manufacturing method of the medium having the constitution shown in FIG. 3.

Each of the metal layer and the dielectric layer may be formed into a thin film by a vapor-phase thin film deposition method such as a vacuum deposition method, a sputtering method, an ion plating method, a CVD (Chemical Vapor Deposition) method, or an MBE (Molecular Beam Epitaxy) method.

In particular, the metal layer is preferably formed by the sputtering method. A target used in the step of forming the metal layer is preferably constituted of a material which contains, as main component, Al, Si and M (wherein M is at least one element selected from a group consisting of Cr and Ni). Sputtering is carried out using a film-formation gas of which main component is a rare gas. The metal layer of a desired composition and thickness can be easily obtained by sputtering.

The dielectric layer is preferably formed by the sputtering method, too. The dielectric layer may be formed by sputtering in a rare-gas atmosphere using a target having the same composition as a composition to be achieved in the dielectric layer. Alternatively, the dielectric layer may be formed by a reactive sputtering method in an oxygen and/or nitrogen atmosphere using a target of metal.

This manufacturing method can realize an information recording medium having main information such as image and voice and enabling sub-information to be additionally recorded at low cost.

<3. Recording and Reproduction Method for Optical Information Recoding Medium>

Next, an example of a recording and reproduction method for an optical information recording medium of the present embodiment is described.

Figure 9:
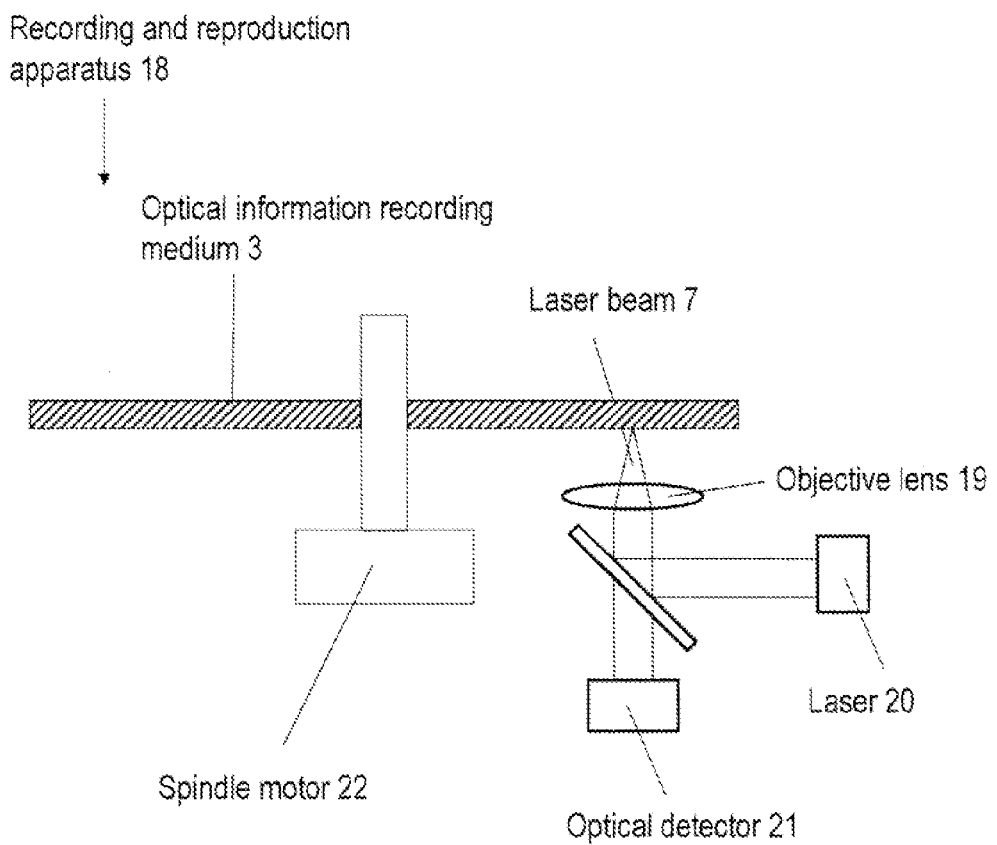
FIG. 9 is a schematic view showing a recording and reproduction apparatus used for recording and reproducing an optical information recording medium according to the present embodiment.

FIG. 9 shows a recording and reproduction apparatus 18 used for recording and reproduction in the optical information recording medium of the present embodiment. An example of the apparatus used for recording and reproduction in case that the optical information recording medium 3 is an optical disk is schematically shown. An apparatus is used for reproducing and reproduction of signal, which is provided with an optical head (not shown) equipped with a laser 20 and an objective lens 19, a driving device (not shown) for guiding a position which is irradiated with laser beam 7 to a predetermined position, a tracking control device and a focusing control device (not shown) for controlling the position in a track direction and a direction vertical to a film surface, a laser driving device (not shown) for modulating laser power, and a spindle motor 22 for rotating the medium.

The recording and reproduction of signal is conducted by rotating the medium with the spindle motor 22 and narrowing the laser beam 7 down to a micro spot by an objective lens 19 to irradiate the medium 3 with the laser beam 7. The signal may be reproduced by applying the laser beam and reading the signal from the medium with an optical detector 21, the power level of the laser beam being lower than that used for recording the signal, not influencing the optical state of the recorded mark (main information and sub-information), and ensuring that a sufficient amount of light for the reproduction of the recording marks is obtained from the medium by the laser-beam irradiation.

The recording and reproduction apparatus is designed such that a mode at which the information is read from the concavo-convex portion formed in the substrate is different from a mode at which the information is read from the added mark formed in the metal layer and one type of information is not affected when the other type of information is read. Further, the recording of information in the metal layer is preferably conducted at a power level of 1 mW to 5 mW when the medium is rotated at a linear velocity corresponding to a 2× speed of BD (BD 2×). When the power level for forming the added mark is too large, there is disadvantage that a high-cost semiconductor laser is required. It is more preferable that the power level is selected from this range to satisfy $1.0 < Rb/Ra < 1.1$ (wherein Ra is a reflectance before recording and Rb is a reflectance after recording).

The wavelength of the laser beam used for recording and reproduction is preferably 350 nm or more and 500 nm or less. The use of the laser beam having wavelength of 405 nm and the lens with NA 0.85 can achieve high-density recording of 25 GB per layer in the information recording medium having a diameter of 12 cm. The use of the laser beam having wavelength of 405 nm and the lens with NA 0.65 can achieve high-density recording of 15 GB per layer in the information recording medium having a diameter of 12 cm.

The information recording medium such as DVD and Blu-ray Disc includes areas called a lead-in area, a data recording area and a lead-out area. Information regarding the structure of the disk, information necessary when recording on the disk, data regarding management information of recorded data, and the like are recorded into the lead-in area through concavo-convex portion. The lead-out area is an area indicating the recording end position of the data. The data recording area is an area in which the main information of the recording medium is recorded through the concavo-convex portion in the case of a read-only medium, and an area saved for recording information in the case of a write-once medium and a rewritable medium. The specific information additionally written in the metal layer of the information recording medium of the present invention is preferably recorded locally in the lead-in area, but may be recorded in an area other than the lead-in area.

Various information can be recorded as sub-information in the medium of the present invention. For example, if an ID number for protecting copy right is recorded as the sub-information, a recording and reproduction apparatus can be adapted to refuse to reproduce a medium with no ID number recorded therein. Alternatively, when the medium is provided as game software, an end point of game may be recorded as sub-information by the recording and reproduction apparatus owned by a user. Alternatively, information for partially changing main component recorded in a non-rewritable form (the concavo-convex portion formed in the substrate) may be recorded as sub-information. When a medium including predetermined contents is manufactured, the present invention allows another business operator (for example, a game-software maker) to record any sub-information in any area of each medium after manufacture of the medium and before delivery of the medium to an end user. This improves versatility of the recording medium of the present invention.

EXAMPLES

The present invention will be described in detail below by way of Examples.

Example 1

In Example 1, in case of using Al—Si—Cr as a composition constituting a metal layer, an influence of the composition of the metal layer exerted on a reflectance, signal quality of a ROM mark, signal quality of an added mark and moisture resistance was examined.

<1. Manufacture of Optical Information Recording Medium>

Thirty-three samples (Nos. 1 to 33) of an optical information recording medium, each sample having the configuration shown in FIG. 3 and including a metal layer with a different composition, were manufactured and the influence evaluationed for each sample. The details are shown below.

A substrate 4 used was a substrate made of a polycarbonate resin, which has a diameter of 12 cm and a thickness of 1.1 mm, and includes a concavo-convex portion (ROM mark formed as main information) on one surface.

On a surface of a substrate 4, including the concavo-convex portion formed thereon, a metal layer 5 of 20 nm thickness which was made substantially of Al—Si—Cr was formed by a sputtering method using an Al—Si—Cr target. Next, an ultraviolet curable resin (acrylic resin) transparent to laser beam was applied on a surface of the metal layer 5 by a spin coating method, and cured by being irradiating with ultraviolet rays to form an optically transparent layer 6 of 100 µm thickness.

In the formation of an Al—Si—Cr metal layer, a sputtering target having a diameter of 200 mm and a thickness of 6 mm was used. A power supply used in the step of forming the metal layer 5 was a DC power supply with an output of 4 kW. The formation of metal layer 5 was conducted by maintaining a gas pressure at about 0.13 Pa in a gas atmosphere of Ar at 25 sccm. The metal layer 5 was formed using a plurality of sputtering targets made of Al, Si and Cr, each having a different content, so that the layers with the compositions shown in Table 1. Whereby, 32 kinds of information recording media, each including a metal layer with a different composition, were manufactured.

<2. Method for Evaluation of Optical Information Recording Medium>

The method for evaluation of an optical information recording medium 3 will be described below. In the evaluation of the optical information recording medium 3, a recording and reproduction apparatus 18 with the general configuration was used, which was equipped with a spindle motor 22 that rotates an optical information recording medium 3, an optical head with a laser 20 that emits laser beam 7, and an objective lens 19 that concentrates laser beam 7 on a metal layer of the optical information recording medium 3 as shown in FIG. 9. In the evaluation, a semiconductor laser having a wavelength of 405 nm and an objective lens having a numerical aperture of 0.85 were used. A linear velocity, at which an information recording medium is rotated, was set to 4.92 m/s (36 Mbps, corresponding to BD 1× speed).

<2.1 Procedure for Evaluation of Reflectance>

A reflectance was evaluated by the following procedure. Using a recording and reproduction apparatus 18, laser beam was emitted toward an optical information recording medium 3, and then the reflectance was measured from the quantity of light reflected from the optical information recording medium 3. Herein, when the reflectance is more than 50%, it was rated "++". When the reflectance is more than 30%, it was rated "+". When the reflectance is less than 30%, it was rated "–" because of poor reflectance.

<2.2 Procedure for Evaluation of Signal Quality of ROM Mark>

Signal quality of a ROM mark was evaluated by the following procedure. Using a recording and reproduction apparatus 18, an average jitter of the ROM mark at a mark length of 2 T to 8 T was measured. As a result of the measurement, when the average jitter is 6.5% or less, signal quality was rated "+", whereas, when the average jitter is more than 6.5%, signal quality was rated "–".

<2.3 Method for Evaluation of Signal Quality of Added Mark>

Signal quality of an added mark was evaluated by the following procedure. First, a metal layer of each recording medium was irradiated with laser beam 7 to form an added mark with a mark length of 90 T. The added mark was formed by selecting an optimum power taking Rb/Ra or the like into consideration according to the composition of the metal layer. Next, an average jitter of an added mark with a mark length of 90 T was measured using a recording and reproduction apparatus 18. As a result of the measurement, when the average jitter is 8.0% or less, signal quality was rated "+", whereas, when the average jitter is more than 8.0%, signal quality was rated "–".

<2.4 Method for Evaluation of Moisture Resistance>

Moisture resistance was evaluated by the following procedure. First, an average jitter of an added mark with a mark length of 90 T was measured in advance using a recording and reproduction apparatus 18. Next, a recording medium was maintained for 200 hours in a constant temperature and high humidity chamber set to 80° C. and 85% RH, and then taken out from the constant temperature and high humidity chamber and a jitter value of the track was measured. Herein, when a change in jitter value is +1.0% or less, moisture resistance was rated "++". When a change in jitter value is +2.0% or less, moisture resistance was rated "+". When a change in jitter value is more than +2.0%, moisture resistance was rated "−".

<2.5 Method for Measurement of Atomic Content>

The method for the measurement of the content of each atom in a metal layer will be described. The content of elements constituting a recording layer of an optical information recording medium 3 was measured by making a sample for analysis of composition. Specifically, a plurality of Al—Si—Cr targets each of which had a different composition and has been used in the formation of recording layer of the medium, were prepared and used to form a 500 nm thick films on a 1 mm thick Si substrate using a sputtering apparatus. The conditions of the formation of a film were the same as those employed when a recording layer of each medium is formed. Next, composition analysis of each film was carried out using an X-ray microanalyzer. The compositions of the metal layer shown in Examples are the results analyzed by the present method, and show the content of each atom assumed that the total of numbers of Al atoms, Si atoms and Cr atoms is 100 atomic %.

<3. Consideration of Evaluation Results>

The optical information recording media manufactured in Example 1 were subjected to the above-mentioned evaluations. The results are shown in Table 1.

Overall evaluation rating in Table 1 was carried out in the following manner. When reflectance rating was "++" and ratings of other items did not include "−", and also rating of at least one item was "++", overall evaluation rating was "*". When ratings of other items did not include "−" and rating of all items was "+", overall evaluation rating was "". When rating of at least one of other items was "−", overall evaluation rating was "−". When rating of the item of reflectance was "+" and ratings of other items did not include "−", overall evaluation rating was "*". When rating of at least one of other items was "−", overall evaluation rating was "−". When rating of the item of reflectance was "−", overall evaluation rating was "−".

TABLE 1

| Disc | Composition of metal layer [at %] | | | Reflectance | Signal quality of ROM mark | Signal quality of added mark | Moisture resistance | Overall evaluation |
|---|---|---|---|---|---|---|---|---|
| | Al | Si | Cr | | | | | |
| 1 | 96 | 2 | 2 | ++ | − | − | − | − |
| 2 | 92 | 4 | 4 | ++ | + | + | + | ** |
| 3 | 84 | 2 | 14 | ++ | + | − | + | − |
| 4 | 84 | 14 | 2 | ++ | + | + | − | − |
| 5 | 83 | 4 | 13 | ++ | + | + | + | ** |
| 6 | 83 | 13 | 4 | ++ | + | + | + | ** |
| 7 | 80 | 12 | 8 | ++ | + | + | + | ** |
| 8 | 78 | 10 | 12 | ++ | + | + | ++ | *** |
| 9 | 78 | 4 | 18 | ++ | + | + | ++ | *** |
| 10 | 74 | 2 | 24 | ++ | + | − | + | − |
| 11 | 74 | 24 | 2 | ++ | + | + | − | − |
| 12 | 73 | 4 | 23 | ++ | + | + | ++ | *** |
| 13 | 73 | 23 | 4 | ++ | + | + | + | ** |
| 14 | 70 | 10 | 20 | ++ | + | + | ++ | *** |
| 15 | 70 | 13 | 17 | ++ | + | + | + | ** |
| 16 | 70 | 20 | 10 | ++ | + | + | + | ** |
| 17 | 63 | 7 | 30 | ++ | + | + | ++ | *** |
| 18 | 62 | 19 | 19 | ++ | + | + | + | ** |
| 19 | 58 | 21 | 21 | + | + | + | + | * |
| 20 | 55 | 15 | 30 | + | + | + | + | * |
| 21 | 50 | 2 | 48 | + | + | − | + | − |
| 22 | 50 | 4 | 46 | + | + | + | + | * |
| 23 | 50 | 15 | 35 | + | + | + | + | * |
| 24 | 50 | 35 | 15 | + | + | + | + | * |
| 25 | 50 | 46 | 4 | + | + | + | + | * |
| 26 | 50 | 48 | 2 | + | + | + | − | − |
| 27 | 42 | 8 | 50 | + | + | + | + | * |
| 28 | 42 | 28 | 30 | + | + | + | + | * |
| 29 | 42 | 48 | 10 | + | + | + | + | * |
| 30 | 30 | 20 | 50 | + | + | + | + | * |
| 31 | 30 | 50 | 20 | + | + | + | + | * |
| 32 | 10 | 20 | 70 | − | + | + | + | − |
| 33 | 10 | 60 | 30 | − | + | + | + | − |

As shown in Table 1, the evaluation results of a reflectance, signal quality of a ROM mark, signal quality of an added mark, and moisture resistance of an optical information recording medium 3 including a metal layer made of an Al—Si—Cr-based material varied depending on the composition of the metal layer.

As is apparent from Table 1, it was recognized that when the content of Al was less than 20 atomic %, there was tendency for the reflectance to decrease. It was also recognized that when the content of Al exceeded 94 atomic %, there was tendency that the crystal grain size of a metal layer increased, and thus the noise content of signal increased and signal quality of a ROM mark deteriorated.

It was recognized that when the content of Si was less than 3 atomic %, there was tendency that variation in reflectance of the additionally-recorded signal decreased, and thus signal quality of the additionally-recorded signal deteriorated.

It was recognized that when the content of Cr was less than 3 atomic %, there was tendency that moisture resistance of a metal layer deteriorated.

Accordingly, when a reflectance, signal quality of a ROM mark, signal quality of an added mark and moisture resistance are taken into consideration, it is considered that an Al—Si—Cr-based material with the composition in which the content of Al atoms is 20 atomic % or more and 94 atomic % or less, the content of Si atoms is 3 atomic % or more and 57 atomic % or less, and the content of Cr atoms is 3 atomic % or more and 57 atomic % or less is suited to constitute a metal layer. This range is shown as the region surrounded by A-B-C in FIG. 7.

The composition in which the content of Al is 60 atomic % or more in the region surrounded by A-B-C is more preferable since it increases a reflectance of a metal layer. This is the region surrounded by A-D-E in FIG. 7, and this region corresponds to the composition range in which the content of Al atoms is 60 atomic % or more and 94 atomic % or less, the content of Si atoms is 3 atomic % or more and 37 atomic % or less, and the content of Cr atoms is 3 atomic % or more and 37 atomic % or less.

Furthermore, the composition in which the content of Al is 80 atomic % or less, the content of Si is 12 atomic % or less, and the content of Cr is 10 atomic % or more in the region surrounded by A-D-E is more preferable since it improves moisture resistance of an added mark. This is the region surrounded by D-F-G-H-I in FIG. 7, and this region corresponds to the composition range in which the content of Al atoms is 60 atomic % or more and 80 atomic % or less, the content of Si atoms is 3 atomic % or more and 12 atomic % or less, and the content of Cr atoms is 10 atomic % or more and 37 atomic % or less.

According to the present Example, it could be confirmed that a high reliable optical information recording medium containing main information such as image and voice, and capable of additionally recording side-information at low costs can be realized by particularly selecting, as the material of a metal layer, a material with the composition in a range wherein the content of Al atoms is 20 atomic % or more and 94 atomic % or less, the content of Si atoms is 3 atomic % or more and 57 atomic % or less, and the content of Cr atoms is 3 atomic % or more and 57 atomic % or less.

Also, it could be confirmed that it is preferred in that an information recording medium exhibiting a higher reflectance can be realized by selecting, as the material of a metal layer, a material with the composition in a range wherein the content of Al atoms is 60 atomic % or more and 9.4 atomic % or less, the content of Si atoms is 3 atomic % or more and 37 atomic % or less, and the content of Cr atoms is 3 atomic % or more and 37 atomic % or less.

Furthermore, it could be confirmed that it is preferred in that an information recording medium having more excellent moisture resistance can be realized by selecting, as the material of a metal layer, a material with the composition in a range wherein the content of Al atoms is 60 atomic % or more and 80 atomic % or less, the content of Si atoms is 3 atomic % or more and 12 atomic % or less, and the content of Cr atoms is 10 atomic % or more and 37 atomic % or less.

Example 2

In Example 2, in case of forming a metal layer using an Al—Si—Ni-based material, an influence of the composition of the metal layer exerted on a reflectance, signal quality of a ROM mark, signal quality of an added mark, and moisture resistance was examined. A plurality of optical information recording media, each including a metal layer with a different composition, were manufactured as samples and then evaluated. The details, will be shown below.

<1. Manufacture of Optical Information Recording Medium>

In the present Example, optical information recording media shown in FIG. 3 were manufactured as samples. The recording media manufactured in the present Example were manufactured so as to have the same configuration as that of media manufactured in Example 1, except that a metal layer 5 was formed using an Al—Si—Ni-based material. In Table 2, the composition of the metal layer of each sample (Nos. 34 to 47) of Example 2 is shown.

The metal layer 5 was formed on a surface of a substrate 4, including a concavo-convex portion formed thereon, by a sputtering method using an target. The conditions of sputtering were the same as those employed in Example 1. The thickness of the metal layer 5 was 20 nm.

<2. Method for Evaluation of Optical Information Recording Medium>

The method for the analysis of the composition of a metal layer of samples manufactured in Example 2, and the method for the evaluation of a reflectance, signal quality of a ROM mark, signal quality of an added mark, and moisture resistance are the same as those used in Example 1.

<3. Consideration of Evaluation Results>

The evaluation results of samples manufactured in Example 2 are summarized in Table 2.

TABLE 2

| | Composition of metal layer [at %] | | | Reflectance | Signal quality of ROM mark | Signal quality of added mark | Moisture resistance | Overall evaluation |
|---|---|---|---|---|---|---|---|---|
| Disc | Al | Si | Ni | | | | | |
| 34 | 96 | 2 | 2 | ++ | − | − | − | − |
| 35 | 84 | 2 | 14 | ++ | + | − | + | − |
| 36 | 84 | 14 | 2 | ++ | + | + | − | − |
| 37 | 80 | 12 | 8 | ++ | + | + | + | ** |
| 38 | 78 | 10 | 12 | ++ | + | + | ++ | *** |
| 39 | 70 | 10 | 20 | ++ | + | + | ++ | *** |
| 40 | 70 | 20 | 10 | ++ | + | + | + | ** |
| 41 | 63 | 7 | 30 | ++ | + | + | ++ | *** |
| 42 | 50 | 2 | 48 | + | + | − | + | − |
| 43 | 50 | 15 | 35 | + | + | + | + | * |
| 44 | 50 | 35 | 15 | + | + | + | + | * |
| 45 | 50 | 48 | 2 | + | + | + | − | − |
| 46 | 30 | 20 | 50 | + | + | + | + | * |
| 47 | 10 | 20 | 70 | − | + | + | + | − |

As shown in Table 2, the evaluation results of a reflectance, signal quality of a ROM mark, signal quality of an added mark, and moisture resistance varied depending on the composition of the metal layer, similarly to Example 1.

As is apparent from Table 2, it was recognized that when the proportion of Al was less than 20 atomic %, there was tendency that the reflectance decreased. It was also recognized that when the proportion of Al exceeded 94 atomic %, there was tendency that the crystal grain size of a metal layer increased, and thus the noise content of signal increased and signal quality of a ROM mark deteriorated.

It was recognized that when the proportion of Si was less than 3 atomic %, there was tendency that variation in reflectance of additionally-recorded signal decreased, and thus signal quality of additionally-recorded signal deteriorated.

It was recognized that when the proportion of Ni in the metal layer was less than 3 atomic %, moisture resistance of a metal layer deteriorated.

Accordingly, when a reflectance, signal quality of a ROM mark, signal quality of an, added mark and moisture resistance are taken into consideration, it is considered that an Al—Si—Ni-based material with the composition in which the content of Al atoms is 20 atomic % or more and 94 atomic % or less, the content of Si atoms is 3 atomic % or more and 77 atomic % or less, and the content of Ni atoms is 3 atomic % or more and 77 atomic % or less is suited to constitute a metal layer.

The composition in which the content of Al is 60 atomic % or more is more preferable since it increases a reflectance of a metal layer. Specifically, the composition in which the content of Al atoms is 60 atomic % or more and 94 atomic % or less, the content of Si atoms is 3 atomic % or more and 37 atomic % or less, and the content of Ni atoms is 3 atomic % or more and 37 atomic % or less is more suited to constitute a metal layer.

Furthermore, it could be confirmed that it is preferred in that an information recording medium having more excellent moisture resistance can be realized by forming a metal layer using a composition in which the content of Al atoms is 60 atomic % or more and 80 atomic % or less, the content of Si atoms is 3 atomic % or more and 12 atomic % or less, and the content of Ni atoms is 10 atomic % or more and 37 atomic % or less.

According to the present Example, it could be confirmed that a high reliable optical information recording medium containing main information such as image and voice, and capable of additionally recording sub-information at low costs can be realized by particularly selecting, as the material of a metal layer, a material with the composition in a range wherein in which the content of Al atoms is 20 atomic % or more and 94 atomic % or less, the content of Si atoms is 3 atomic % or more and 77 atomic % or less, and the content of Ni atom is 3 atomic % or more and 77 atomic % or less.

Also, it could be confirmed that it is preferred in that an information recording medium exhibiting a higher reflectance can be realized by selecting, as the material of a metal layer, a material with the composition in a range wherein the content of Al atoms is 60 atomic % or more and 94 atomic % or less, the content of Si atoms is 3 atomic % or more and 37 atomic % or less, and the content of Ni atoms is 3 atomic % or more and 37 atomic %, or less.

Furthermore, it could be confirmed that it is preferred in that an information recording medium having more excellent moisture resistance can be realized by selecting, as the material of a metal layer, a material with the composition in a range wherein the content of Al atoms is 60 atomic % or more and 80 atomic % or less, the content of Si atoms is 3 atomic % or more and 12 atomic % or less, and the content of Ni atoms is 10 atomic % or more and 37 atomic % or less.

Example 3

In Example 3, in order to examine the conditions where both signal quality of a ROM mark and signal quality of an added mark become satisfactory, signal quality of an added mark and a ROM mark were evaluated by varying a ratio of a reflectance Ra of a medium before being irradiating with laser beam for recording an added mark to a reflectance Rb after recording an added mark (i.e. after laser irradiation).

<1. Manufacture of Optical Information Recording Medium>

In the present Example, optical information recording medium 3 shown in FIG. 3 was manufactured as a sample in the same manner as in Example 1. All the samples (No. 48) of the present Example had the same configuration, and values of Ra and Rb were designed by adjusting a laser irradiation power for forming an added mark. The method for manufacturing an information recording medium, and the method for evaluating a reflectance and signal quality are as described in Example 1. The composition of the metal layer used in the present Example is as follows: Al:Si:Cr=78:4:18 [atomic %].

<2. Method for Evaluation of Optical Information Recording Medium>

Signal quality of a ROM mark and that of an added mark were evaluated in the following manner. After forming the added mark using the recording and reproduction apparatus used in Example 1, an average jitter of a ROM mark, and that of an added mark were measured. As a result of the measurement, when the average jitter of the ROM mark was 6.5% or less, signal quality was rated "+", whereas, when the average jitter was more than 6.5%, signal quality was rated "−". When the average jitter of the added mark was 8.0% or less, signal quality was rated "+", whereas, when the average jitter was more than 8.0%, signal quality was rated "−".

<3. Consideration of Evaluation Results>

In Table 3, the evaluation results of samples manufactured in Example 3 are summarized.

TABLE 3

| Disc | Rb/Ra | Signal quality of added mark | Signal quality of concavo-convex mark | Overall evaluation |
|---|---|---|---|---|
| 48 | 1.00 | − | + | − |
|  | 1.03 | + | + | ** |
|  | 1.05 | + | + | ** |
|  | 1.07 | + | + | ** |
|  | 1.10 | + | − | − |
|  | 1.20 | + | − | − |

As is apparent from Table 3, it was found that signal quality of an added mark was satisfactory in a range where Rb/Ra>1.0. It was also found that signal quality of a ROM mark was satisfactory in a range where Rb/Ra<1.1.

According to the present Example, it could be confirmed that satisfactory signal quality can be obtained in both a ROM mark and an added mark when a reflectance Ra before recording of an added mark (before laser irradiation) and a reflectance Rb after recording of an added mark (after laser irradiation) satisfy a relation expression: 1.0<Rb/Ra<1.1.

Example 4

In Example 4, a metal layer of an information recording medium including two information layers was formed using an Al—Si—Cr-based material or an Ag—Bi-based material, and then a reflectance, signal quality of a ROM mark, signal quality of an added mark, and moisture resistance were evaluated.

1. Manufacture of Optical Information Recording Medium>

Samples (Nos. 49 to 51) manufactured in the present Example had the same layer configuration as that of the optical information recording medium 3 shown in FIG. 5. A substrate 4 used was a substrate made of a polycarbonate resin, which has a diameter of 12 cm and a thickness of 1.1 mm, and includes a concavo-convex portion (ROM mark formed as main information) on one surface.

A first metal layer 16 was formed on a surface of a substrate 4, including the concavo-convex portion formed thereon. The first metal layer 16 was an Al—Si—Cr metal layer (atomic ratio of 78:4:18) or an Ag—Bi metal layer (atomic ratio of 99:1), and it was formed by a sputtering method.

Next, an ultraviolet curable resin (acrylic resin) was applied on a surface of the first metal layer 16 by a spin coating method. Then, a substrate including a concavo-convex portion, having a shape complementary to a concavo-convex portion to be formed on an intermediate layer 10, formed thereon was brought into close contact with an ultraviolet curable resin. While the substrate was brought into close contact, the ultraviolet curable resin was cured and then the substrate was removed. By this method; the intermediate layer 10 having a thickness of about 25 μm, including the concavo-convex portion (ROM mark formed as main information of a second information layer) was formed. Furthermore, a second metal layer 11 was formed on a surface of the intermediate layer 10. The second metal layer 11 was an Al—Si—Cr metal layer (atomic ratio of 78:4:18) or an Ag—Bi metal layer (atomic ratio of 99:1), and it was formed by a sputtering method.

On a surface of this second metal layer 11, an optically transparent layer 6 having a thickness of about 75 μm was formed by a spin coating method using an ultraviolet curable resin (acrylic resin).

The film formation conditions (sputtering conditions) of each metal layer were the same conditions as those employed in Example 1.

<2. Method for Evaluation of Optical Information Recording Medium>

The methods for evaluating a reflectance, signal quality of a ROM mark, signal quality of an added mark, and reliability of each information layer of each sample manufactured in Example 4, were the same as those used in Example 1.

<3. Consideration of Evaluation Results>

In Table 4, combinations of materials of a first metal layer and a second metal layer in each sample, and evaluation results are summarized.

TABLE 4

| Disc | Composition of metal layer | | Reflectance | Signal quality of ROM mark | Signal quality of added mark | Moisture resistance | Overall evaluation |
|---|---|---|---|---|---|---|---|
| 49 | First metal layer | Al—Si—Cr | + | + | + | + | * |
|    | Second metal layer | Al—Si—Cr | + | + | + | + | * |
| 50 | First metal layer | Al—Si—Cr | + | + | + | + | * |
|    | Second metal layer | Ag—Bi | + | + | − | + | − |
| 51 | First metal layer | Ag—Bi | + | + | − | + | − |
|    | Second metal layer | Ag—Bi | + | + | − | + | − |

As shown in Table 4, in an information layer including a metal layer formed of an Al—Si—Cr-based material, an added mark having excellent signal quality could be recorded, similarly to the information recording medium composed of a single information layer as shown in FIG. 3.

Particularly, in a disk No. 49, sub-information could be recorded in two information layers. In a disk No. 50, sub-information could be satisfactorily recorded in the metal layer only in an information layer (first information layer) that was far from the surface on which laser beam was incident.

In a disk (No. 51) in which both a first metal layer and a second metal layer were made of Ag—Bi, sub-information could not be recorded in any metal layer.

According to the present Example, it could be confirmed that a two-layered medium capable of additionally recording information in a reproduction-only information recording medium can be manufactured by constituting a first metal layer and/or a second metal layer using an Al—Si—Cr-based material.

Example 5

In Example 5, electrical resistivity of an Al—Si—Cr composition serving as a metal layer used in the optical information recording medium of the present invention was evaluated by a four-terminal method.

<1. Manufacture of Measurement Sample>

Film compositions of samples (Nos. 52 to 53) manufactured in the present Example are as shown in Table 5. A metal layer with each composition was formed on a surface of a quartz substrate in a thickness of about 20 nm by a sputtering method. The conditions of sputtering were the same as those employed in Example 1.

<2. Method for Evaluation of Sample>

Using a resistivity meter manufactured by Mitsubishi Chemical Corporation under the trade name of Loresta GP as an evaluation device, bulk resistance was calculated from sheet resistance which was measured. With respect to each composition, an average of three samples was adopted as the measurement results.

<3. Consideration of Evaluation Results>

In Table 5, the composition of a metal layer and bulk resistance are summarized.

TABLE 5

| Disc | Composition of metal layer [at %] | | | Bulk resistance [μΩ · m] |
|---|---|---|---|---|
|      | Al | Si | Cr | |
| 52 | 81 | 9 | 10 | 2.00 |
| 53 | 74 | 8 | 18 | 4.21 |

It could be confirmed that the value of bulk resistance varied depending on the composition, and bulk resistance may increase as the amount of Si or Cr to be added to Al increases. These compositions have the composition similar to that of some compositions used in Examples. This shows that inclusion of Al, Si and M in metal layer (reflective film) ensures an added mark and a ROM mark with satisfactory quality as well as durability of a metal film even in case of high electrical resistivity.

Example 6

In Example 6, a metal layer was formed by selecting two compositions as typical composition of an Al—Si—Cr metal layer, and then reflectance and recording sensitivity of an information recording medium were evaluated.

<1. Manufacture of Measurement Sample>

The compositions of the metal layer of samples (Nos. 52 to 53) manufactured in the present Example are as shown in Table 6. Information recording media with the configuration shown in FIG. 3, composed of a metal layer with these compositions were manufactured by the method similar to that used in Example 1.

<2. Method for Evaluation of Sample>

The information recording media thus manufactured were evaluated using the same device as that used in Example 1. A reflectance was evaluated in accordance with the method explained in Example 1. In the present Example, recording sensitivity of the recording medium was evaluated by setting a linear velocity, at which an information recording medium was rotated, to 9.84 m/s (72 Mbps, corresponding to BD 2×-speed). The recording sensitivity was indicated by a minimum value of a recording power that was required for signal quality of an added mark to be rated "+" when signal quality of an added mark was measured in accordance with the evaluation method explained in Example 1.

<3. Consideration of Evaluation Results>

In Table 6, the composition of the metal layer, and reflectance and recording sensitivity of the recording medium are summarized.

TABLE 6

| Disc | Composition of metal layer [at %] | | | Reflectance [%] | Recording sensitivity [mW] |
|---|---|---|---|---|---|
|  | Al | Si | Cr |  |  |
| 54 | 81 | 9 | 10 | 40.2 | 5.0 |
| 55 | 74 | 8 | 18 | 37.2 | 4.0 |

The reflectance and recording sensitivity of the recording medium varied depending on the composition of the metal layer. Specifically, it could be confirmed that the reflectance decreases and recording sensitivity becomes satisfactory as the amount of Si or Cr to be added to Al increases. From these results, it could be confirmed that it is possible to realize an information recording medium in which disk reflectance is 30% or more when irradiated with laser beam of 405 nm, and recording sensitivity is 5 mW or less, by using an Al—Si—Cr metal layer with the composition shown in Table 6.

Example 7

In the same manner as in Example 1, except that the composition of the metal layer 5 was as follows: Al:Si:Mg=80:12:8 (atomic %), a sample (No. 56) with the configuration shown in FIG. 3 was manufactured. The reflectance, signal quality of a ROM mark, signal quality of an added mark, and moisture resistance of the obtained information recording medium were evaluated by the same evaluation methods as those explained in Example 1. The results are shown in Table 7.

TABLE 7

| Disc | Reflectance | Signal quality of ROM mark | Signal quality of added mark | Moisture resistance | Overall evalatuion |
|---|---|---|---|---|---|
| 56 | ++ | + | + | − | − |

As shown in Table 7, moisture resistance of the metal layer made of a material containing Al and Si, and Mg added thereto was rated "−". This shows that a combination of Al, Si and Cr and/or Ni gives a write-once metal layer, having satisfactory moisture resistance.

The optical information recording and method for manufacturing the same of the present invention give a medium that makes it possible to additionally record sub-information at low costs, in addition to main information such as image and voice, without exerting an influence on main information, and the medium is particularly useful as CD-ROM, DVD-ROM, and BD-ROM.

| Description of Numerals | |
|---|---|
| 1 | Concavo-convex portion |
| 2 | Added mark |
| 3 | Optical information recording medium |
| 4 | Substrate |
| 5 | Metal layer |
| 6 | Optical transparent layer |
| 7 | Laser beam |
| 8 | Dielectric layer |
| 9 | First metal layer |
| 10 | Intermediate layer |
| 11 | Second metal layer |
| 12 | First information layer |
| 13 | Second information layer |
| 14 | N-th metal layer |
| 15 | N-th information layer |
| 16 | Al—Si—M—O layer |
| 17 | Al—Si—M layer |
| 18 | Recording and reproduction apparatus |
| 19 | Objective lens |
| 20 | Laser |
| 21 | Optical detector |
| 22 | Spindle motor |

The invention claimed is:

1. An information recording medium comprising an information layer on a substrate, wherein said information layer has a metal layer, which is characterized in that:
   (1) said information layer has a concavo-convex portion formed on said substrate,
   (2) said metal layer essentially consists of Al, Si, and M (wherein M is at least one element selected from a group consisting of Cr and Ni), optical property of the metal layer can be changed by irradiating said metal layer with laser beam, to form an added mark, whereby reproducible information can be recorded by laser-beam irradiation, and
   an Al atom content is 20 atomic % or more and 94 atomic % or less and an Si atom content is 3 atomic % or more and 77 atomic % or less and an M atom content is 3 atomic % or more and 77 atomic % or less assuming that a total number of Al atoms, Si atoms and M atoms contained in said metal layer is 100 atomic %.

2. The information recording medium according to claim 1, wherein the Al atom content is 60 atomic % or more and 94 atomic % or less and the Si atom content is 3 atomic % or more and 37 atomic % or less and the M atom content is 3 atomic % or more and 37 atomic % or less assuming that a total number of the Al atoms, the Si atoms and the M atoms contained in said metal layer is 100 atomic %.

3. The information recording medium according to claim 1, wherein, assuming that a total number of the Al atoms, the Si atoms and the M atoms contained in said metal layer is 100 atomic %, a composition of the three atoms is within a range enclosed by compositional points (Al 60, Si 3, M 37), (Al 80, Si 3, M 17), (Al 80, Si 10, M 10), (Al 78, Si 12, M 10), and (Al 60, Si 12, M 28) in a ternary composition diagram of which apexes are Al, Si and M.

4. The information recording medium according to claim 1, wherein a reflectance Ra before applying laser beam for recording information in said metal layer of said information recording medium and a reflectance Rb after applying laser beam for recording information in said metal layer, can satisfy 1.0<Rb/Ra<1.1.

5. The information recording medium according to claim 1, wherein a thickness of said metal layer is 3 nm or more and 100 nm or less.

6. An information recording medium comprising n information layers (wherein n is an integer of 2 or more) stacked on said substrate, which is characterized in that at least one of the information layers comprises the metal layer recited in claim 1.

7. The information recording medium according to claim 1, which enables information to be recorded in said metal layer of said information layer with a laser beam having a wavelength of 350 nm or more and 500 nm or less, and enables information recorded in the said metal layer of said information layer to be reproduced with the laser beam having a wavelength of 350 nm or more and 500 nm or less.

8. The information recording medium according to claim 1, which enables information to be recorded only once in said metal layer of said information layer.

9. The information recording medium according to claim 1,
which is a read-only medium wherein concavo-convex portion gives main information that is not rewritable, and
enables sub-information to be additionally recorded in said metal layer.

10. The information recording medium according to claim 1, which is characterized in that a layer of which main component is an oxide(s) of Al, Si and/or M (wherein M is at least one element selected from a group consisting of Cr and Ni) is provided on one or both sides of said metal layer.

11. The information recording medium according to claim 1, which is characterized in that a reflectance is 30% or more when being irradiated with laser beam of 405 nm.

12. The information recording medium according to claim 1, of which recording sensitivity is 5 mW or less.

13. A method for producing the information recording medium according to claim 1, comprising a step of forming a metal layer directly on a substrate, or on another layer which is formed on the substrate, which is characterized in that:
the step of forming the metal layer comprises forming the metal layer by a sputtering method, and
a sputtering target used in the step of forming the metal layer comprises Al, Si and M (wherein M is at least one element selected from a group consisting of Cr and Ni).

14. The method for producing the information recording medium according to claim 13, which is characterized in that the metal layer formed on the substrate by the sputtering method is brought into contact with oxygen at ordinary temperature and ordinary pressure, to form an oxide of which main component is one or more oxides of one or more elements selected from Al, Si and M (wherein M is at least one element selected from a group consisting of Cr and Ni), on one or both sides of the metal layer.

* * * * *